Oct. 12, 1971  R. V. HENDRICKSON  3,611,680
MACHINE FOR REMOVING VEGETATION FROM WATERWAYS
Filed May 2, 1969  3 Sheets-Sheet 3
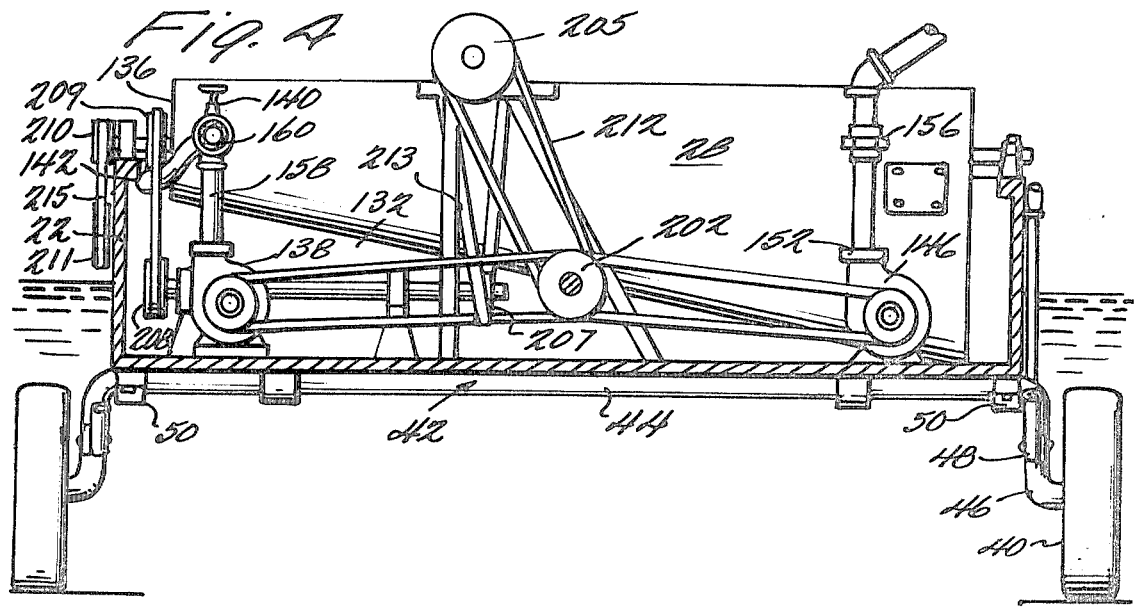
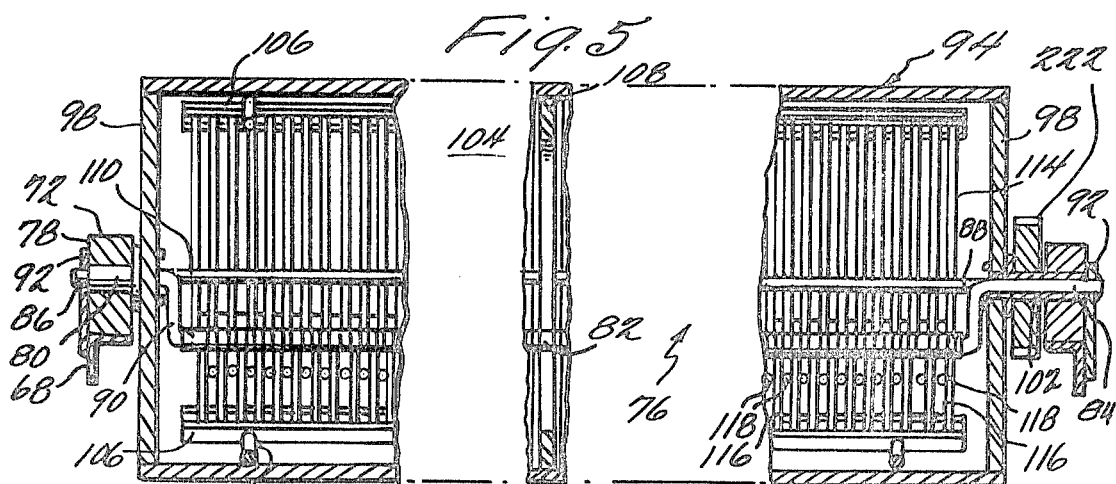
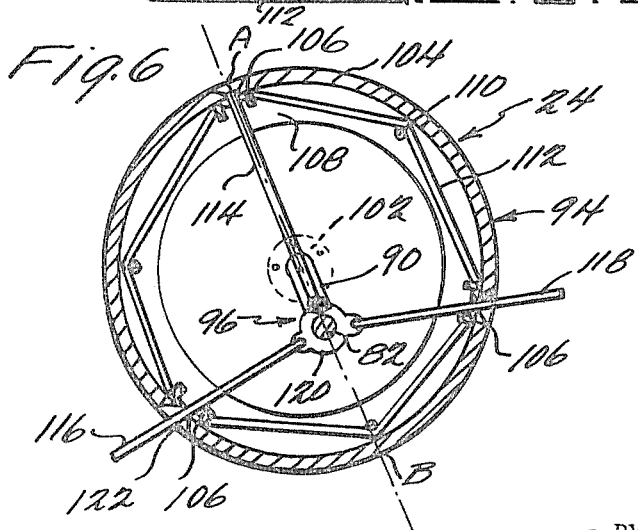
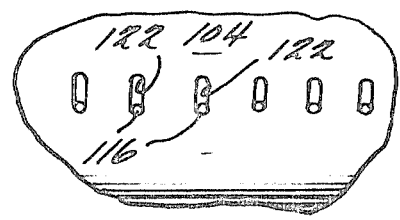
INVENTOR
RAY V. HENDRICKSON
BY Cushman, Darby & Cushman
ATTORNEYS United States Patent Office 3,611,680
Patented Oct. 12, 1971

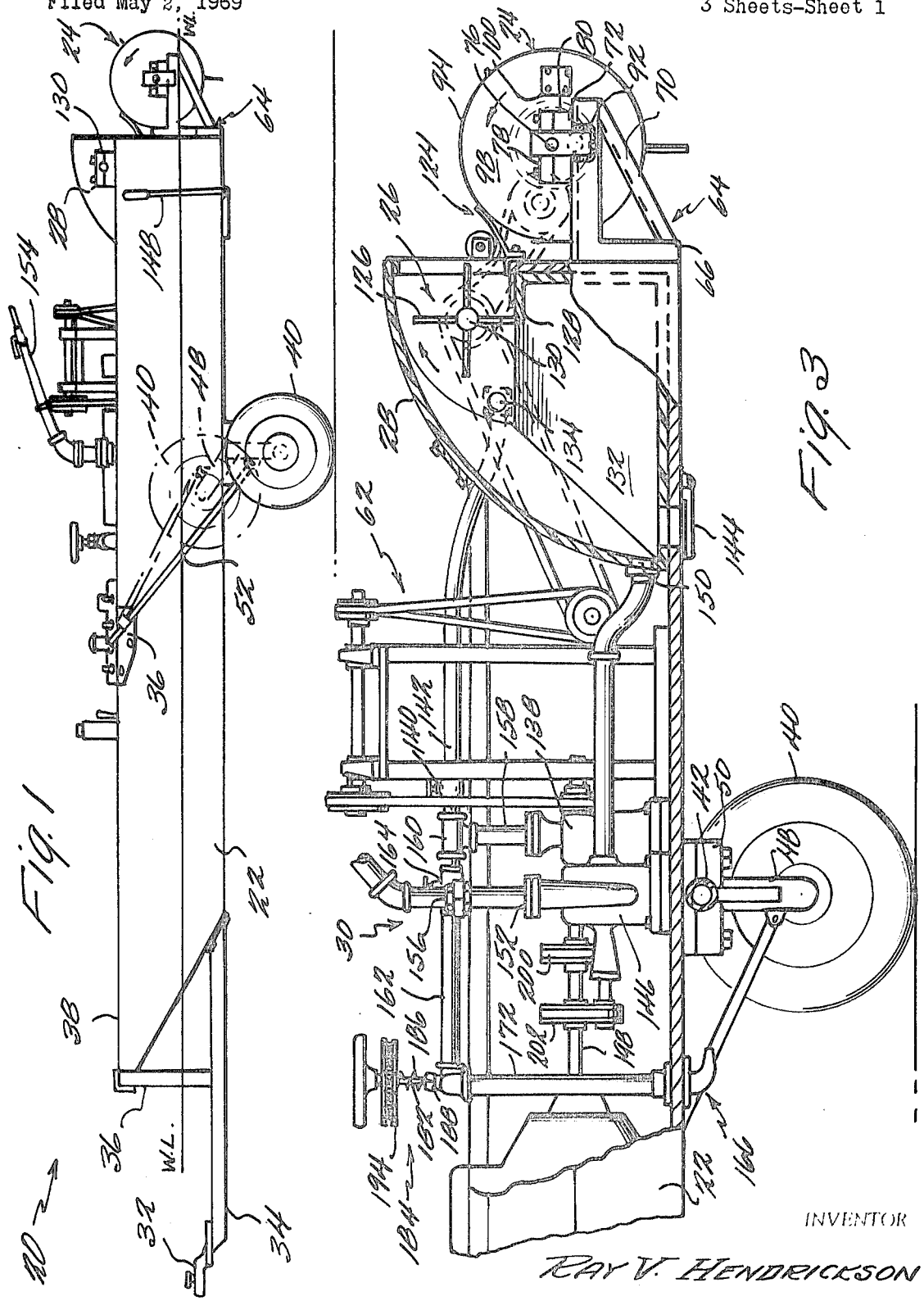

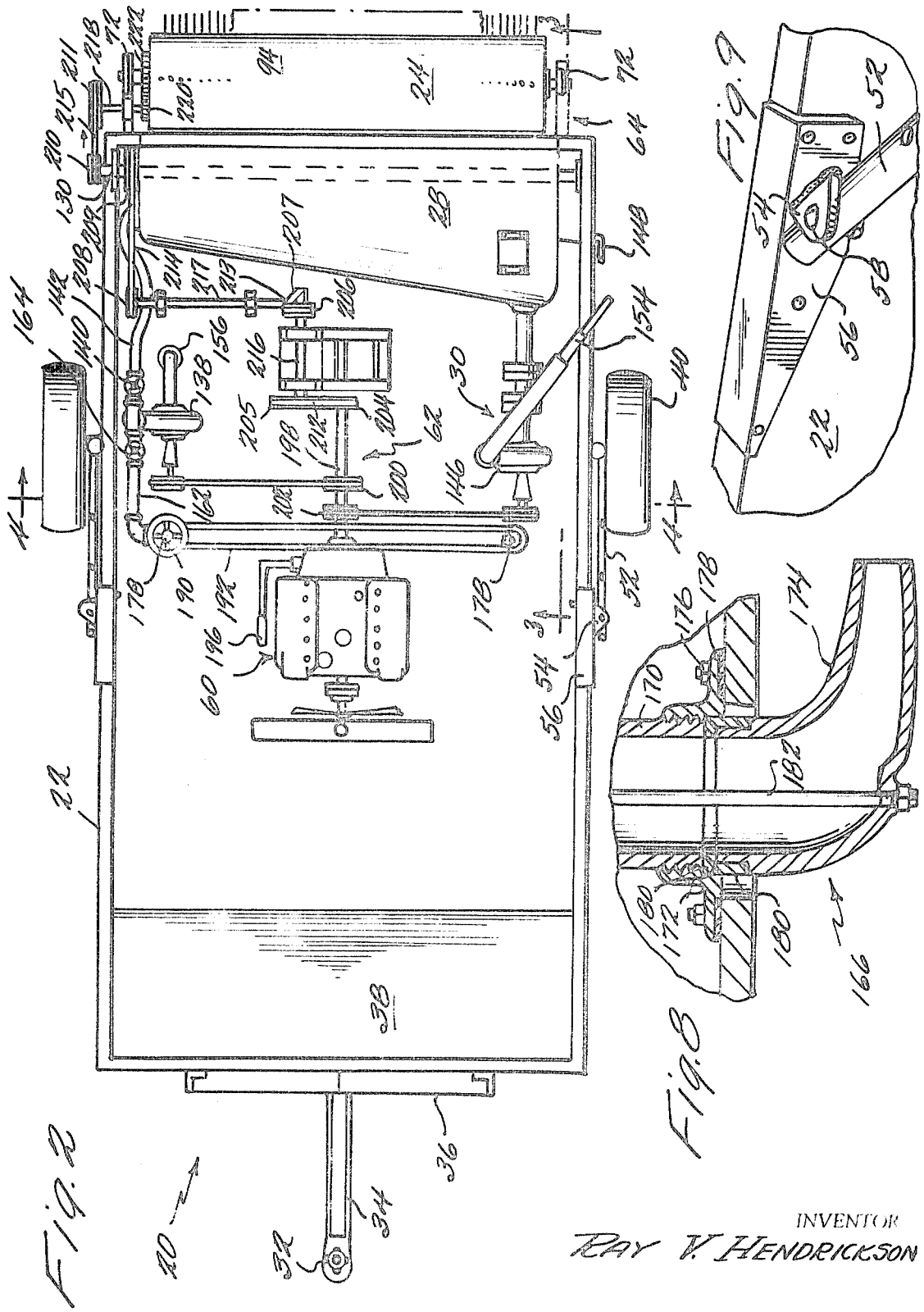

3,611,680
MACHINE FOR REMOVING VEGETATION
FROM WATERWAYS
Ray V. Hendrickson, 235½ 33rd St.,
West Palm Beach, Fla. 33407
Filed May 2, 1969, Ser. No. 821,448
Int. Cl. A01d 45/08
U.S. Cl. 56—9                                              10 Claims

ABSTRACT OF THE DISCLOSURE

An apparatus for removing vegetable matter from waterways comprises a hull having an eccentric rotary rake which gathers vegetation from the waterway, a shredder which receives the vegetation from the rake and shreds the vegetation so that it can be easily disposed of, a hopper into which the shredded vegetation is deposited and a pump connected to the hopper which picks up the shredded vegetation and ejects it through a nozzle onto the shore, barge or other suitable means. The hull is self-propelled by water jets and is provided with retractable wheels so that the hull can be towed to and from the waterway after which the wheels are retracted so that they will not interfere with the operation of the apparatus even in extremely shallow water.

BRIEF DESCRIPTION OF THE INVENTION

This invention relates to a weed controlling or harvesting apparatus and, in particular, to an apparatus for gathering, shredding and discharging vegetation located in waterways and the like.

In certain parts of the country especially the south, the growth of weeds in canals and similar waterways has become a tremendous problem in that the weeds choke up or clog the waterways making navigation in these waterways difficult. There has also been a substantial interest shown in recent years with regard to the growth and harvesting of crops on waterways and the like to help solve the increasing serious food shortage in the world today.

It is, therefore, a primary object of the present invention to provide a machine for either mechanically removing troublesome weeds or harvesting plant growth from waterways. Through the periodic use of the present machine, the life cycle of many weeds can be interrupted thereby not only resulting in the temporary removal of weeds but also the permanent removal of even deeply-rooted weeds since without the foliage, the roots of the weeds would deteriorate. In a similar manner, the present invention can be used for the harvesting of crops.

It is a further object of the invention to provide a machine which gathers, shreds and discharges the vegetation in one continuous operation without the need for any additional equipment.

It is still a further object of the invention to provide a machine with the above character which is self-propelled and easy to transport to and from waterways.

In a preferred embodiment, the harvest machine includes a flat bottom hull with an eccentric rotary rake for gathering vegetation, a shredder for shredding the vegetation which has been gathered by the rake so that it may be readily disposed of and a discharge means for disposing of the shredded vegetation. The eccentric rotary rake includes a hollow drum which is partially submerged during operation. During each revolution of the drum, sets of tines are first extended beyond the surface of the drum and into the water to gather the vegetation after which the tines are retracted into the drum so that the vegetation can be removed from the drum by a wiper blade which deposits the vegetation into the mouth of a hopper. In the mouth of a hopper, a shredder with rapidly rotating blades pulverizes the vegetation and deposits the vegetation into the hopper. A pump with its suction or inlet end connected to the sump of the hopper pumps the semi-solid weed mass from the hopper through a discharge nozzle which disposes of the vegetation by ejecting it onto a bank of the waterway or into a barge, tank or similar receptacle. The hopper is provided with a gate valve which supplements the water level in the sump of the hopper to prevent cavitation and a water jet for washing the weeds toward the inlet of the discharge pump.

The apparatus is self-propelled and can be steered by means of water jets which are supplied with water from a second pump. The apparatus is also provided with a set of wheels which enable the machine to be towed like a trailer. These wheels for towing can be swung from an extended position to a storage position where the wheels are retracted so as not to interfere with the operation of the harvesting machine even in shallow water.

The above-mentioned objects and advantages of the present invention will become apparent and other objects and advantages of the present invention will become apparent from the following detailed description when taken in conjunction with the accompanying drawings in which:

FIG. 1 is a side-elevational view of the machine with the wheels shown in the extended position in solid line and in the retracted position in phantom line;

FIG. 2 is a plan view from above of the machine as illustrated in FIG. 1;

FIG. 3 is a fragmentary longitudinal section of the machine taken substantially along lines 3—3 of FIG. 2;

FIG. 4 is a transverse sectional view taken substantially along lines 4—4 of FIG. 2;

FIG. 5 is a cross-sectional view of the harvesting drum;

FIG. 6 is a transverse cross-sectional view of the harvest drum;

FIG. 7 is a fragmentary view of the surface of the drum showing the tines projecting through the drum;

FIG. 8 is an enlarged view of one form of a water jet which can be used in the propulsion of the harvesting machine; and FIG. 9 is an enlarged fragmentary view of one of the adjustment assemblies for the wheel assemblies.

DETAILED DESCRIPTION OF THE INVENTION

Turning now to the figures which disclose a preferred embodiment of the invention, the harvest machine designated generally by reference numeral 20 comprises a flat bottom hull 22, an eccentric rotary rake 24, a shredding mechanism 26, a hopper 28 and a discharge assembly 30.

The hull 22 is conventional in construction with suitable ribbing or bracing and can be made of wood, metal, fiberglass or other conventional materials. The stern of the hull is provided with a conventional trailer hitch 32 which is welded or otherwise suitably secured to a horizontally extending member 34 of an angle iron bracket assembly that is bolted or otherwise suitably secured to the stern of the hull. The horizontal member 34 protrudes beyond the stern of the boat and is provided with a V-shaped brace 36 which is welded to the horizontal member and extends between member 34 and the upper edge of the stern where it is bolted or otherwise secured to the stern of the hull adjacent the rear deck 38.

The hull 22 is also provided with a set of wheels 40 mounted in a conventional manner on an axle 42 which wheels can be pivoted from a lower extended towing position to an upper retracted storage position. The axle 42 comprises a horizontal midsection 44 extending beneath the hull and outer offset horizontal extensions 46 which are joined by intermediate sections 48 to midsection 44, the intermediate sections 48 extending at substantially right angles with respect to the horizontal sections. The wheels 40 are mounted on the outer horizontal extensions 46 and the axle 42 is pivotally secured to the underside of the hull 22 by bearing block assemblies 50. To prevent lateral movement of the axle 42 relative to the bearing blocks 50, collars, flanges or other suitable means (not shown) can be provided on axle 42 on either side of the bearing block. While a single axle has been shown, it is to be understood that a pair of split axles can also be used if desired.

Each side of the wheel assembly is provided with a brace 52 which is pivotally mounted at its lower end to spaced-apart lugs on one of the intermediate sections 48 of the axle, by a pin or other suitable means which passes through aligned apertures in the brace and lugs. The upper end of each brace 52 is secured to a lug 54 on a bracket 56 that is bolted or otherwise suitably affixed to the side of the hull. Each brace 52 can be adjusted with respect to the bracket 56 and then secured in a fixed position to the bracket by means of bolt asemblies 58 which pass through apertures in the brace and the lug. The apertures are located along the brace so that they are aligned with the aperture in the bracket lug 54 when the wheels are in the lowered position and the retracted storage position.

Through the use of the trailer hitch 32 along with the retractable wheel assemblies, the harvest machine can be readily towed to and from the locations of intended use. Furthermore, after the machine has been placed in the water, the wheels 40 can be retracted to the upper storage position so that they do not interfere with the operation of the machine even in shallow water. Once the operation is finished, the wheels can again be lowered after which the machine can be removed from the water and towed away.

As best shown in FIG. 2, the rotary rake 24, shredder 26 and discharge assembly 30 of the harvesting machine along with the propulsion system of the machine are preferably driven by a conventional internal combustion engine 60 through a suitable gear train 62. These components of the machine and their interrelation will now be described in detail.

The eccentric rotary rake 24 is mounted on the bow or forward portion of the hull 22 by means of a pair of bracket assemblies 64, each of which have vertical plates 66 which are bolted or otherwise rigidly secured in fixed positions adjacent either side of the hull 22 on the forward wall by both assemblies or other suitable securing means. Each bracket assembly 64 has a horizontally extending member 68 extending forward from the upper end of the vertical plate and a diagonal brace 70 extending between the lower end of the plate and the forward end of the horizontally-extending member.

A conventional bearing block assembly 72 is bolted, welded or otherwise secured to the upper surface of the horizontal member 68 of each assembly 64 with each bearing block assembly 72 receiving and retaining one end of the rotary rake axle 76. Each of the bearing block assemblies 72 comprises separable upper and lower members 78, 80 that are bolted together and have semi-circular cut-out portions which are substantially equal in diameter to the axle 76 so as to firmly retain the axle 76 in position and alignment.

The axle 76 of the rotary rake includes an offset midportion 82 and terminal portions 84, 86 which are joined to the midportion by intermediate portions 88, 90 which extend at substantially right angles to the other portions of the axle. The longitudinal axes of the terminal portions 84, 86 and the offset portion 82 of the axle extend parallel to the forward wall of the hull with the offset portion being forward and below the terminal portions. As best shown in FIG. 5, each end of the axle 76 passes through an aperture in and is welded or otherwise rigidly secured to a plate 92 which, in turn, is firmly affixed to one of the brackets 64 by bolt assemblies, welding or other suitable means. This arrangement prevents the rotation of the axle so that the offset midportion 82 of the axle 76 will be retained in the same angular position relative to the other components of the rotary rake as well as the hull of the boat of reasons as will be explained more fully hereinafter.

The rotary rake 24 also comprises a hollow cylindrical drum 94 which is rotatably mounted on the terminal portions 84, 86 of the axle 76 and tine assemblies 96 which are rotatably mounted on the offset midportion 82 of the axle. The end walls 98 of the drum are each provided with removable plates 100 for gaining access to the interior of the drum and a sleeve or bearing 102 which is bolted or otherwise rigidly secured to the end wall drum and rotatably mounted on the terminal portions 84, 86 of the axle. Extending between and bolted or otherwise suitably secured to or carried on the end walls 98 of the drum 94 is a cylindrical metallic wall 104 which can be formed in one integral section or a plurality of arcuate sections. The wall 104 has substantially channel-shaped longitudinal braces 106 which extend between and are bolted or otherwise suitably secured to the end walls 98 of the drum and welded or otherwise secured to the inner surface of the cylindrical wall 104. In addition, an annular brace 108 having substantially the same outer diameter as the inner diameter of cylindrical wall 104 is positioned within the drum midway between the end walls of the drum to lend additional support to cylindrical wall 104 and the longitudinal braces 106 within the drum. Annular brace 108 is in turn braced by longitudinal tie rod assemblies 110 which extend between and are secured to the annular brace and the end walls 98. The longitudinal braces 106 are further strengthened by sets of tie rod assemblies 112 which extend between and are welded or otherwise secured to tie rod assemblies 110 and the braces 106.

The tine assemblies 96 extend from one end of the offset midportion 82 of axle 76 to the other with the spacing between the tine assemblies 96 being determined by the requirements of the particular operation. Each tine assembly 96 comprises a first tine 114, which is welded to and extends outwardly from a sleeve or bearing 120, along with second and third tines 116, 118 which are pivotally secured to and extend outwardly from sleeve 120 so that changes of the angles between the tines during each revolution of the rotary rake are permitted. Tines 116, 118 are preferably secured to the lugs of the sleeves by pins which pass through aligned apertures within the lugs and the inner terminal ends of the tines. The sleeves 120, in turn, are rotatably mounted on the offset midportion 82 of the axle 76 which as previously described is located below and forward of the axis of rotation of the drum. The outer portions of the tines 114, 116, 118 pass through elongated slots 122 provided in braces 106 and the cylindrical walls 104 of the drum 78. These slots 122 serve to both guide the tines as they reciprocate relative to braces 106 and wall 104 and to carry the tines thereby causing the rotation of the tine assemblies 96 as the drum 94 rotates. The tines 114, 116 and 118 are each somewhat less than but substantially equal in length to the outer radius of drum 94 plus the distance midsection 82 is offset from the axis of rotation from drum 94. This assures the withdrawal of the tines into the drum during each revolution so that they are either flush with or somewhat recessed relative to the outer surface of the drum at point A while at the same time insuring that the tines will not be completely withdrawn from slots 122 which effect the rotation of the tine assemblies 96. As viewed in FIG. 6, the drum rotates counterclockwise and from point A to point B during each revolution, each tine goes from its fully retracted position at A to its fully extended position at B. Then, from point B to point A, each tine goes from its fully extended position to its fully retracted position whereby during that part of each revolution wherein a tine passes from point A to B, it is gradually extended beyond the surface of the drum so as to gather vegetation as it passes through the water and whereby during that portion of each revolution wherein the tine moves from point B to point A, the tine is gradually withdrawn back into the drum so that it will not interfere with the removal of vegetation from the drum by the wiper blade 124. The wiper blade 124 is made up of a flexible sheet of material such as rubber and is bolted or otherwise secured to the hull 22 adjacent the lower edge of the hopper mouth so as to insure that the vegetation gathered by the rotary rake is directed into the shredder. The vegetation is forced into the shredder 26 by following vegetation as it is removed from the rake 24 by the blade and also by the action of the shredder.

The pulverizer or shredder 26 is made up of four blades 126, preferably metallic, and a plate 128 which extend across the entire mouth of the hopper 28 each of the blades and the plate being at least equal in length to the length of cylinder 94. The blades 126 are mounted on an axle 130 which extends horizontally through the hopper in spaced relation to plate 128 which extends inwardly from the mouth of the hopper. The plate 128 is oriented with respect to the blades of the shredder so that the clearance between the blades 126 and the inner edge of the plate 128 is very minute whereby the rapidly rotating blades of the shredder pulverize the vegetation which is deposited on the plate from the wiper blade 124 and carry it into the hopper. By varying the clearance between the blades 126 and the plate 128, and the rotational speed of the shredder 26, the degree of shredding of the vegetation can be varied.

As is best shown in FIGS. 2 and 4, the hopper 28 extends across substantially the entire bow of the hull 22 and is at least as long as the drum 94 of the rotary rake 24. As indicated above, the hopper has a mouth extending across the upper forward end of the hopper in which is mounted the rear portion of the wiper blade 124 and the shredder 26. As viewed in FIG. 4, the floor 132 of the hopper 28 is inclined downward from the left to the right to cause the semi-solid vegetation mass emitted from the shredder 26 to flow to the lower end of the hopper which is below water level. The flow of the semi-solid vegetation mass along the floor to the sump of the hopper is facilitated by means of a jet of water which is injected into the hopper along the floor of the hopper from a nozzle 134 located in the end wall 136 at the left end of the hopper. The nozzle 134 is supplied with water under pressure from pump 138 which pumps water not only to the nozzle 134 but also the propulsion and steering system as will be explained more fully hereinafter. A valve 140 is provided in the line 142 between the pump and the nozzle so that the flow of water from the jet can be regulated or cut off all together if desired.

The sump portion of the hopper 28 is provided with a gate valve 144 which is pivotally secured to the underside of the hull and supplements the water level within the sump so that the discharge pump 146 will not cavitate. This valve is controlled by a lever 148 extending upwardly along the side of the hull from the gate valve so that the amount of water within the sump can be adjusted during the operation. The discharge pump 146 has an intake 150 coupled to the sump portion of the hopper 28 at a point below the water line of the hull. With the intake for the pump located at the lowermost portion or sump of the hopper 28 below the water line and with the gate valve 144 to supplement the supply of water within the hopper, the pump 146 will not cavitate for lack of water and, in addition, the vegetation cannot collect within the hopper in a location where it will not be eventually removed by the discharge pump. The outlet 152 of the discharge pump is connected to a nozzle 154 through a swivel assembly 156 which permits nozzle to be swung through 360 degrees so that the vegetation can be discharged in whatever direction desired. As shown, the nozzle 154 is given an upward inclination so to increase the distance of discharge with the apparatus being capable of discharging the semi-solid vegetation mass up to 100 feet.

Ppum 138 which supplies nozzle 134 and the propulsion and steering system of the present invention has an intake 156 located below the water line of the hull and in the preferred form of the invention shown in the bottom of the hull. Water is taken up through the inlet 156 and discharged from the pump 138 into line 158 where at T connection 160 it can flow through either or both lines 142 and 162. Gate valves 140 and 164 are provided in lines 142 and 162 to adjust and regulate the flow of water through each of the lines as desired. As discussed above, line 142 leads to a nozzle which flushes hopper 28. Line 162 however, leads to a pair of nozzles or jets 166 which are located on either side of the center line of the hull 22 on the bottom of the hull.

As best shown in FIGS. 3 and 8, each jet 166 comprises a pipe assembly 170, which is affixed to the floor of the hull by a flange member 172 and a jet nozzle 174. Pipe assembly 170 is threaded into or otherwise secured to flange member 172 and the flange member 172 is, in turn, affixed to the floor of the hull by bolt assemblies 176. A sealing ring 178 or other suitable sealant is interposed between the flange and the hull to prevent the seepage of water into the hull.

As shown, jet nozzle 174 is an elbow tapered at its free end and provided at its other end with an annular Teflon bearing 180 which is press fit or otherwise secured to the nozzle to facilitate the rotation of the nozzle relative to pipe assembly 170. The bearing 180 is L-shaped in transverse cross-section with an upper surface bearing against pipe assembly 170 and a lateral surface bearing against flange member 172. The jet nozzle is held against the pipe assembly 170 by rod 182 which is rigidly affixed to the nozzle at its lower end so that the rod and nozzle rotate together. The rod 182 passes up through pipe assembly 170 along the center line of the pipe assembly and extends above the upper end of the pipe assembly 170 along the center line of the pipe assembly and extends above the upper end of the pipe assembly 170 where a spring tensioning assembly 184 is provided to urge the bearing 180 of the nozzle 174 into sealing engagement with the pipe assembly 170. The spring tensioning assembly 184 has a compressed spring 186 interposed between a boss on the bottom of sprocket 194 and a conventional packing nut 188 that is secured to the pipe assembly 170 and rotatably retains rod 182.

While a preferred form of the jets 166 has been shown and described, it is to be understood that modifications and equivalent structures can be resorted to if desired. With the preferred construction, the nozzles 174 can be rotated through 360 degrees so that the machine can be both steered and propelled in any direction by means of the jets 166. The free end of the elbow, as shown, is tapered thereby forming a nozzle 174. However, the amount of taper, if any, and the diameter of the outlet can be selected in accordance with the requirements of the particlular machine.

The rotation of jet nozzles 174 of the present invention is controlled by steering wheel 190 which is affixed to one of the rods 182 and an endless chain drive 192 which connects sprockets 194 affixed to rods 182 adjacent the upper ends of the rods. Through the endless chain and sprocket arrangement, by turning wheel 190 both jets are turned simultaneously to steer and propel the machine in the desired direction.

As briefly discussed above, power plant or internal combustion engine 60 drives the pumps 138 and 146 along with the shredder 26 and the rotary rake 24. A conventional clutch mechanism with a hand lever 196 is provided to disengage the engine 60 from the drive train which transmits the power from the engine 60 to the components of the machine. While not shown, it is to be understood that conventional means including a conventional ignition and fuel system is provided for engine 60. However, since this does not comprise part of the present invention, it will not be discussed in detail.

The drive train from the power plant 60 comprises a shaft 198 driven by engine 60 when the clutch is engaged. Mounted on the shaft are pulleys 200 and 202 with pulley 200 driving a belt connected to a pulley on the drive shaft of pump 138 and pulley 202 connected to a belt which drives a pulley on the drive shaft of pump 146. The relative diameters of the pulleys on shaft 198 and the drive shafts of the pumps can be coordinated to adjust the r.p.m. of the pumps relative to each other and relative to the r.p.m. of engine 60. In addition, it is to be understood that suitable clutch mechanisms can be provided intermedate the pumps 138, 146 and drive shaft 198 so that either or both of these pumps can be disconnected from the main drive train without the other components having to be stopped.

The main drive train to the shredder 26 and rotary rake 24 includes drive shaft 198, pulleys 204 to 211 and belts 212 to 215. Belt 212 interconnects pulleys 204 and 205; belts 213 interconnect pulleys 206 and 207; belts 214 interconnect pulleys 208 and 209; and belt 215 interconnects pulleys 210 and 211. Pulleys 205 and 206 are affixed to axle 216; pulleys 207 and 208 are affixed to axle 217; pulleys 209 and 210 are affixed to axle 130 and pulley 211 is affixed to shaft 218 which is, in turn, mounted on bracket 64 by means of a conventional bearing block assembly. Shaft 218 has a gear 220 on the inner end thereof which meshes with a gear 222 affixed to the end of drum 94 to rotate the drum 94 in a counterclockwise direction as viewed in the figures. Since pulleys 209 are affixed to shaft 130 of shredder 26, rotation of the pulleys by the belts 214 causes rotation of the shredder 26. Of course, it is to be understood that the r.p.m. of the shredder 26 and the rake 24 can be regulated relative to each other and the other components of the apparatus through the selection of suitable pulley and gear diameters.

OPERATION

The machine removes vegetation from a waterway or the like by means of the rotary rake 24 which is partially submerged during the operation. As the tines of the rotary rake 24 enter the water during each revolution of the rake, they are being gradually extended beyond the surface of the drum 94 whereby they gather the vegetation. After the tines reach point B where they are fully extended, they are gradually retracted until at point A they are flush with or recessed within the drum so that wiper blade 124 can remove the vegetation from the smooth surface of the drum. Although retraction of the tines commences after point A is passed, it should be noted that the tines remain extended beyond the surface of the drum a sufficient distance for the following increment of the revolution to carry the vegetation up over the drum 94 to wiper blade 124.

Once the vegetation is removed from the drum 94 by the wiper blade 124, it is carried into the mouth of the hopper 28 and shredder 26 by the the action of the shredder and the push of following vegetation deposited on the wiper blade by the rotary rake 24. Once in the shredder, the vegetation is pulverized into a semi-solid mass by the blades 126 of the shredder with the degree of pulverization being governed by the r.p.m. of the shredder blades and the clearance between the blades 126 and plate 128. After passing through the shredder, the semi-solid vegetation mass is dumped into the hopper 28 where the inclination of the hopper floor 132 together with the water jet 134 causes the semi-solid vegetation mass to flow to the sump end of the hopper. At this point, the semi-solid mass of vegetation is picked up by the inlet 150 of the discharge pump 146 and flows through the discharge pump and out through nozzle 154 where it is discharged onto the shore, a barge or other suitable means which depends on the function for which the machine is being utilized. As indicated above, since the intake of the discharge pump is below the water line, the gate valve 144 enables the water level within the hopper to be maintained at a level above the intake of the discharge pump to prevent cavitation.

The second pump 138 which supplies water to the flushing jet 134 in the hopper and the steering system has an inlet 156 which draws water up through the bottom of the hull and into the pump after which it is discharged into either or both the line 142 leading to the flushing jet and the line 162 leading to water steering jet assemblies 166. Through wheel 190 and, consequently, jets 166, the direction of thrust of jets 166 relative to the hull can be controlled and the machine can be maneuvered and propelled in the direction desired. By regulating the flow of fluid to the driving jets 166 with gate valve 164, the speed of the machine through the water can be regulated.

While a preferred form of the invention has been shown and described, it is to be understood that all suitable modifications and equivalents may be resorted to which fall within the scope of the invention.

What is claimed is:

1. An apparatus for removing vegetation from waterways and the like comprising:
    hull means;
    gathering means for gathering vegetation, said gathering means comprising a rotary rake consisting of a cylindrical drum and said rotary rake having tines passing through apertures in the cylindrical wall of said drum which reciprocate relative to an outer surface of the cylindrical wall of said drum from retracted positions to permit removal of vegetation from said drum for deposit in said shredder means to extended positions for gathering vegetation, said gathering means being rotatably carried by said hull means;
    shredder means for shredding vegetation gathered by said gathering means, said shredder means comprising a surface on which vegetation from said drum is deposited and blade means movable relative to said surface whereby vegetation passing between said blade means and said surface is shredded; and
    discharge means for disposing of said vegetation after said vegetation has been shredded.

2. In the apparatus of claim 1:
    means mounting said tines for rotation about an axis offset with respect to the axis of rotation of said drum to cause said reciprocal motion of said tines relative to the outer surface of the cylindrical wall of said drum.

3. In the apparatus of claim 1:
    said discharge means comprising a hopper into which vegetation from said shredder means is deposited and discharge pump means for removing shredded vegetation from said hopper.

4. In the apparatus of claim 3:
    said hopper having a floor which is inclined toward an inlet of said discharge pump means to aid the flow of vegetation to the discharge pump means inlet.

5. In the apparatus of claim 4:
    said hopper having means located below the water line of said hull for admitting water to said hopper to prevent cavitation of said discharge pump means, the inlet of said discharge pump means being connected to said hopper below said water line.

6. In the apparatus of claim 4:
    means for discharging water into said hopper adjacent an upper end of said hopper floor to facilitate the flow of vegetation to said discharge pump means inlet.

7. In the apparatus of claim 1:
    means for propelling and steering said hull comprising nozzle means for directing a pressurized fluid and a means for supplying pressurized fluid to said nozzle means.

8. In the apparatus of claim 7:
said hull means being provided with wheel means, means securing said wheel means to said hull means for permitting movement of said wheel means from an extended towing position to a retracted storage position.

9. An apparatus for removing vegetation from waterways and the like comprising:
hull means, said hull means having a water line;
rotary rake means for gathering vegetation, said rotary rake means being carried by said hull means, said rotary rake means comprising a cylindrical drum rotatably carried by said hull and tines passing through apertures in the cylindrical wall of said drum which tines are mounted within said drum for rotation about an axis offset with respect to the axis of rotation of said drum to cause reciprocal motion of said tines relative to an outer surface of the cylindrical wall of said drum from retracted positions to permit removal of vegetation from said drum to extended positions for gathering vegetation;
wiper blade means for removing vegetation from said drum;
shredder means for shredding vegetation removed from said rotary rake by said wiper blades, said shredder means comprising a surface on which vegetation from said drum is deposited and blade means movable relative to said surface whereby vegetation passing between blade means and said surface is shredded;
hopper means into which vegetation from said shredder means is deposited, said hopper means having a sump; and
discharge pump means for removing shredded vegetation from said hopper, said discharge pump means having an inlet connected to said hopper means at said sump.

10. In the apparatus of claim 9:
said sump being located below the water line of said hull and said hopper having means located below the water line of said hull for admitting water to said sump to prevent cavitation of said discharge pump means.

References Cited

UNITED STATES PATENTS

| 1,481,177 | 1/1924 | Bayard et al. | 56—9 |
| 2,181,863 | 12/1939 | Bell | 56—9 |
| 991,333 | 5/1911 | Lybeck | 56—9 UX |

FOREIGN PATENTS

| 759,667 | 5/1967 | Canada | 56—9 |

LOUIS G. MANCENE, Primary Examiner

J. N. ESKOVITZ, Assistant Examiner

U.S. Cl. X.R.

56—364